Patented Mar. 17, 1925.

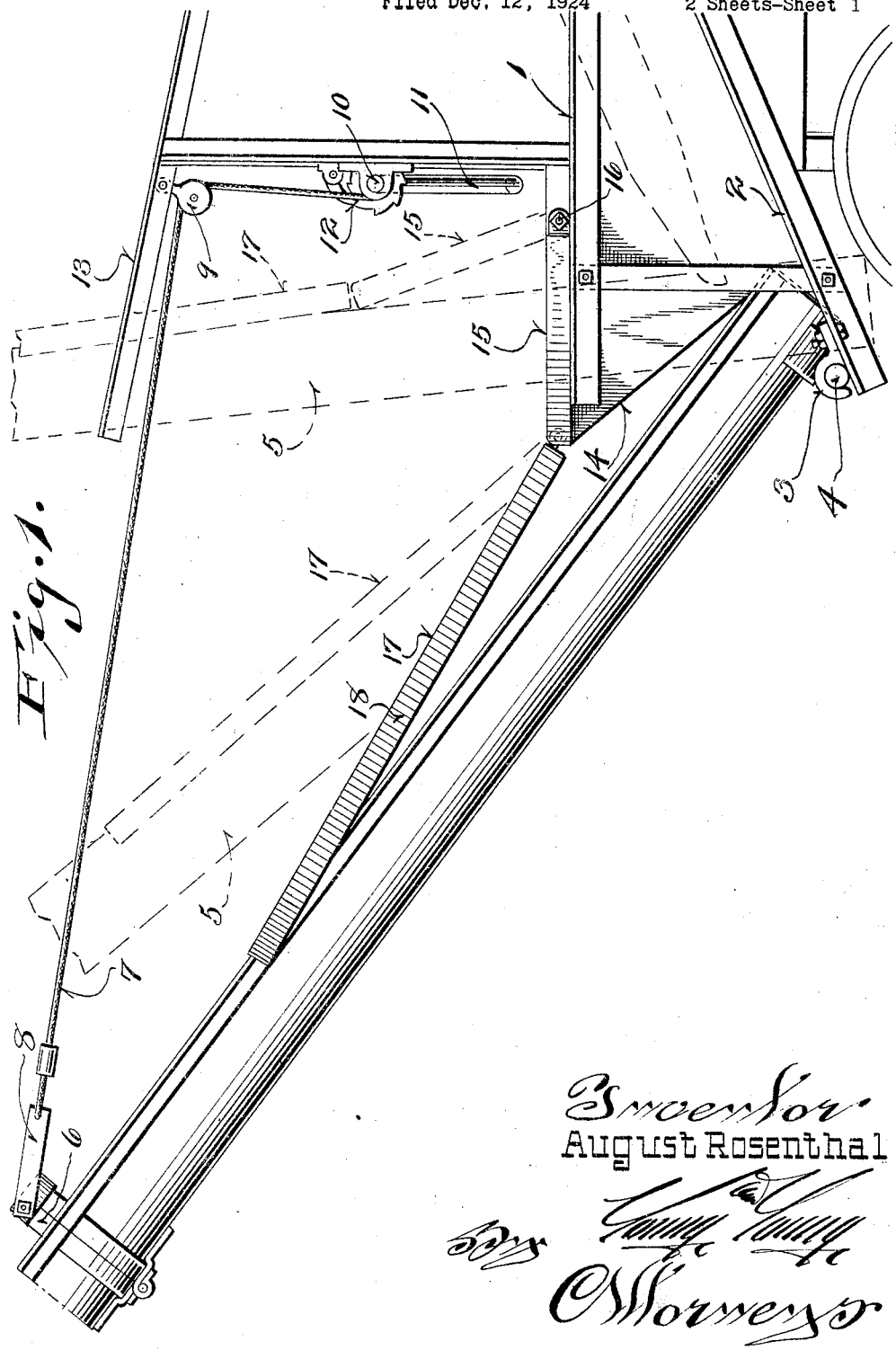

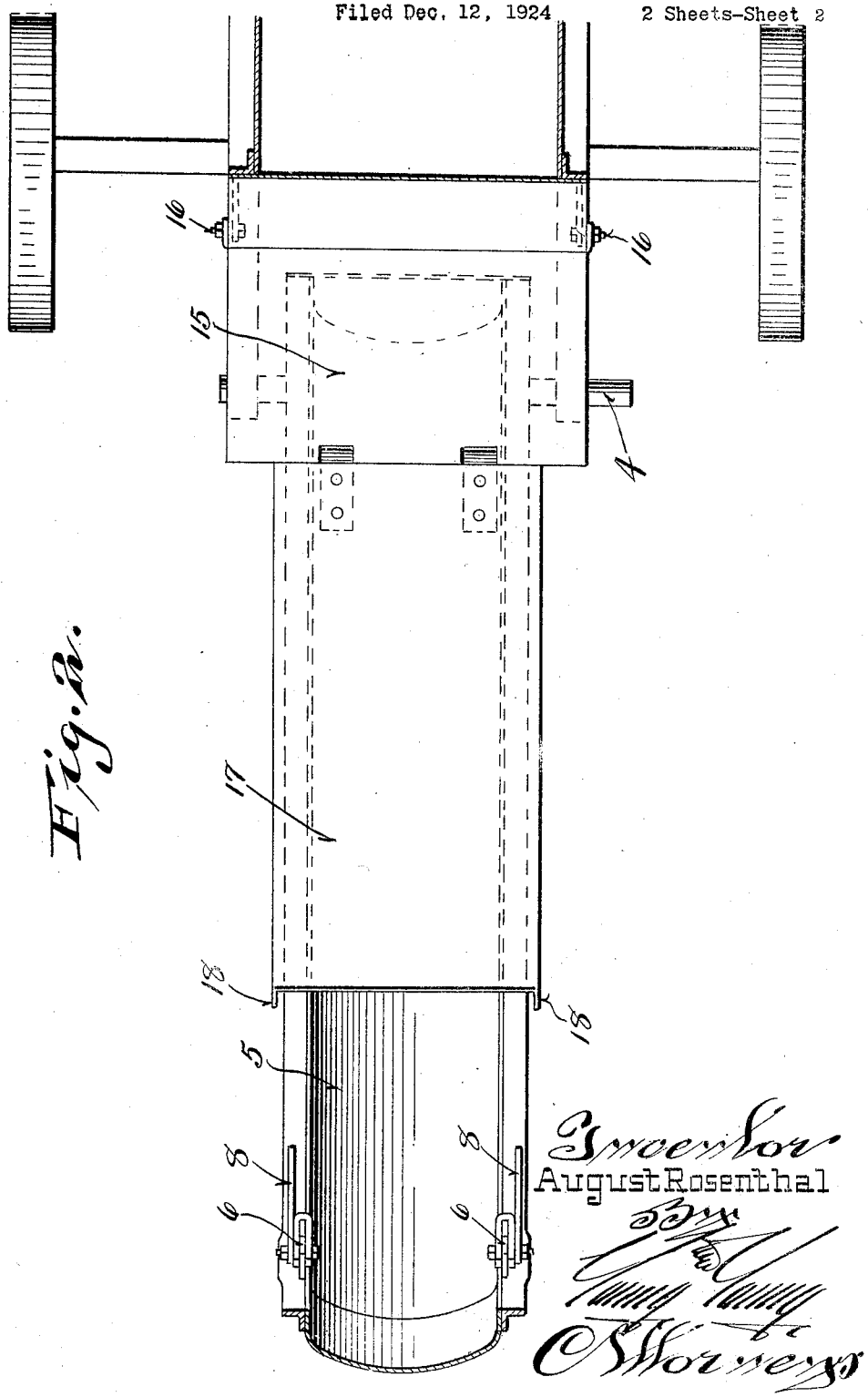

1,530,204

UNITED STATES PATENT OFFICE.

AUGUST ROSENTHAL, OF WEST ALLIS, WISCONSIN.

CORN HUSKER AND SHREDDER.

Application filed December 12, 1924. Serial No. 755,455.

*To all whom it may concern:*

Be it known that I, AUGUST ROSENTHAL, a citizen of the United States, and resident of West Allis, in the county of Milwaukee and State of Wisconsin, have invented certain new and useful Improvements in Corn Huskers and Shredders; and I do hereby declare that the following is a full, clear, and exact description thereof.

This invention relates to a corn husker and shredder.

Corn huskers and shredders, which will hereinafter be referred to as corn huskers, have heretofore been provided with a body portion and a feeding table adjacent an upper front corner of the husker and with a delivery chute usually provided with a conveyor pivoted to the lower portion of the body of the machine below the feeding table. It has been customary in this type of machine to provide a platform for the feeding operator mounted above the pivotal joint of the chute with the body portion. Obviously, the platform limited the angle at which the chute could be elevated, and consequently when the machine was drawn along a roadway, it was impossible to elevate the chute beyond a certain angle.

Objects of this invention are to so organize the corn husker that the delivery chute may be elevated to any desired angle, to provide a corn husker in which the operator's platform is pivotally joined to the body of the machine and is adapted to rock upwardly whenever the chute is elevated to an extreme angle and to thus freely move out of the way of the chute, and to provide a pivotally mounted shield preferably carried by the platform and protecting the chute from dropping dirt and trash from the material fed to the machine.

Further objects are to provide a corn husker in which no sacrifice of rigidity of the operator's platform is made although the platform is hingedly mounted upon the machine, and in which a simple and strong construction is secured.

An embodiment of the invention is shown in the accompanying drawings, in which:—

Figure 1 is a fragmentary side elevation of the front portion of the corn husker.

Figure 2 is a plan view of the structure shown in Figure 1, a portion only of the chute being shown in each figure.

The machine comprises a body portion which is made up of sheet metal held by the bolted angle irons or channel irons. The horizontally extending channel irons 1 which are projected forwardly, as shown in Figure 1, and the diagonally extending lower channel irons 2 are similarly projected forwardly. Bearings 3 are bolted to the front end of the diagonal channel irons 2 and carry the trunnions 4 of the delivery chute 5. This delivery chute is usually provided with a conveyor not shown, and is adapted to be rocked about the pivotal support to the desired angle. It is provided with upwardly projecting lugs 6 intermediate its ends to which cables 7 are attached through the medium of intermediate relatively short straps 8, as shown in Figure 1. These cables pass rearwardly over pulleys 9 secured to the machine and are adapted to be wound upon a shaft or drum 10, such shaft being provided with a manipulating crank 11 and a pawl and ratchet construction 12 to hold the chute in any desired position of adjustment.

It is customary in these machines to provide a portion adjacent the upper front portion of the machine along which the material is slid. This feeding portion is preferably provided with side angle irons 13 which project forwardly, as shown in Figure 1. Further, it is preferable to provide a pair of triangular shield plates 14 adjacent the lower front end of the body portion of the machine, as illustrated in Figure 1.

In order to provide a place for the feeding operator to stand, a platform 15 is provided, as shown in both figures of the drawing. This platform is pivotally joined at its inner end, as indicated at 16, to the body portion of the machine. It is adapted to rest upon the projecting channel irons 1 to secure a firm and adequate support. The outer end of the platform is pivotally joined to a protecting flap or shield 17 which is equipped with marginal flanges 18 positioned on opposite sides of the delivery chute 5.

Under normal conditions when the machine is operating the feeding operator stands upon the platform 15 and feeds the corn stalks or similar material to the machine. Any trash that may fall from this material does not pass into the delivery chute 5 but is shielded therefrom by the plate 17 and platform 15. However, when the chute 5 is elevated to a position such as shown in dotted lines in Figure 1, the platform pivots and rocks upwardly together with the shield plate 17. Further than this in all intermediate positions of the chute, as shown in dotted lines in Figure 1, the shield plate 17 lies over and protects the delivery chute 5 and thus prevents entrance of trash into such chute.

It is, of course, to be understood that the body portion is equipped with the usual stripping rolls and shredding mechanism, certain of the stripping rolls being shown in dotted lines in Figure 1, and that a forward delivery portion for the shredded or cut material is provided in the usual manner although this has no direct bearing upon the invention and has not been shown in the drawings.

It will thus be seen that a corn husker has been provided in which the husked corn is received by a delivery chute, in which a feeding operator's platform is pivotally carried by the machine and is provided with a pivotally mounted guard plate for the chute.

It will further be seen that the machine permits the elevation of the delivery chute to any desired angle and that the platform and shield plate will rock upwardly to accommodate the elevated chute.

Although the invention has been described in considerable detail, it is to be understood that the invention may be variously embodied and is, therefore, to be limited only as claimed.

I claim:

1. In a corn husker, the combination of a main body portion having a feeding portion adjacent an upper end, a delivery chute hinged to the lower portion of the main body portion, and an operator's platform hinged to said main body portion above the hinged end of said chute and adapted to rock upwardly when said chute is rocked upwardly.

2. A corn husker comprising a body portion adapted to receive material at its upper front end, an operator's platform pivoted to the front portion of the machine below such upper front and, a delivery chute pivoted to the body portion below such platform, and means for elevating said chute, said platform adapted to be rocked upwardly by said chute when said chute is elevated.

3. A corn husker comprising a body portion adapted to receive material at its upper front end, a delivery chute pivoted to the body portion adjacent its lower front end, an operator's platform pivoted to the front of the body portion intermediate its upper and lower ends, and a guard flap pivoted to the outer end of said platform and covering a portion of said chute, said platform and said flap being adapted to rock upwardly when said chute is elevated 4. A corn husker comprising a body portion adapted to receive material at its upper front end, said body portion having a forwardly projecting beam on each side thereof, an operator's platform pivoted to the front of said body portion, and adapted to rest upon said beams, a delivery chute pivoted to the front of said body portion below said platform, and adapted to rock said platform upwardly when said chute is elevated.

5. A corn husker comprising a body portion adapted to receive material at its upper front end, said body portion having a forwardly projecting beam upon each side thereof, a feed operator's platform pivoted to the front of said body portion and adapted to rest upon said beams, a delivery chute pivoted to the front of said body portion below said platform and extending upwardly and outwardly, means for elevating said chute and a flap pivoted to the outer end of said platform and overhanging a portion of said chute, said flap having downwardly projecting flanges positioned on opposite sides of said chute.

In testimony that I claim the foregoing I have hereunto set my hand at Milwaukee, in the county of Milwaukee and State of Wisconsin.

AUGUST ROSENTHAL.